United States Patent
Kaufmann

(10) Patent No.: US 10,018,124 B2
(45) Date of Patent: Jul. 10, 2018

(54) BALL BEARING, IN PARTICULAR PISTON ROD BALL BEARING AND PISTON ROD WITH BALL BEARING

(71) Applicant: Hilite Germany GmbH, Marktheidenfeld (DE)

(72) Inventor: Dietmar Kaufmann, Tiefenthal (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 137 days.

(21) Appl. No.: 14/984,923

(22) Filed: Dec. 30, 2015

(65) Prior Publication Data
US 2016/0265448 A1    Sep. 15, 2016

(30) Foreign Application Priority Data

Mar. 10, 2015 (DE) .................. 10 2015 103 463

(51) Int. Cl.
| | | |
|---|---|---|
| F02B 75/04 | (2006.01) | |
| F02B 75/32 | (2006.01) | |
| F02D 15/02 | (2006.01) | |
| F16J 1/22 | (2006.01) | |
| F16C 7/06 | (2006.01) | |
| F16C 11/06 | (2006.01) | |
| F16C 11/10 | (2006.01) | |
| F16J 1/12 | (2006.01) | |
| F16J 7/00 | (2006.01) | |
| F16C 23/10 | (2006.01) | |

(52) U.S. Cl.
CPC ............ *F02D 15/02* (2013.01); *F02B 75/045* (2013.01); *F16C 7/06* (2013.01); *F16C 11/069* (2013.01); *F16C 11/0619* (2013.01); *F16C 11/0623* (2013.01); *F16C 11/106* (2013.01); *F16J 1/12* (2013.01); *F16J 1/22* (2013.01); *F16J 7/00* (2013.01); *F16C 23/10* (2013.01); *F16C 2360/22* (2013.01)

(58) Field of Classification Search
CPC ........ F02D 15/02; F02B 75/045; F02B 75/04; F16C 7/06; F16C 11/0619; F16C 11/0623; F16C 11/069; F16C 11/06; F16J 1/012; F16J 1/22; F16J 7/00
USPC ........................................... 123/48 B
See application file for complete search history.

(56) References Cited

U.S. PATENT DOCUMENTS

| | | | |
|---|---|---|---|
| 2,856,250 A | 10/1958 | Thoma | |
| 2,894,548 A | 7/1959 | Peck et al. | |
| 3,107,505 A * | 10/1963 | Koss | ........ F16D 3/221 464/141 |
| 4,601,603 A | 7/1986 | Nakayama | |
| 5,153,976 A | 10/1992 | Benchaar et al. | |
| 5,247,873 A | 9/1993 | Owens et al. | |

(Continued)

FOREIGN PATENT DOCUMENTS

| | | |
|---|---|---|
| DE | 659600 C | 5/1938 |
| DE | 2757198 A1 | 6/1979 |

(Continued)

*Primary Examiner* — Syed O Hasan
(74) *Attorney, Agent, or Firm* — Von Rohrscheidt Patents

(57) ABSTRACT

A ball bearing including a ball head arranged at a support rod and supported in a ball head receiver, characterized in that the ball head is secured at an outer surface of the ball head in the ball head receiver by a retaining ring against sliding out of the ball head receiver. The invention also relates to a piston rod with the ball bearing.

3 Claims, 3 Drawing Sheets

(56) References Cited

U.S. PATENT DOCUMENTS

2010/0300410 A1* 12/2010 Arnold ................. F01B 3/0002
123/48 B
2015/0300272 A1* 10/2015 Pluta .................... F02B 75/045
123/48 R

FOREIGN PATENT DOCUMENTS

| DE | 2934218 A1 | 3/1981 |
|---|---|---|
| DE | 3607149 A1 | 9/1987 |
| DE | 3607150 A1 | 9/1987 |
| DE | 29702140 | 4/1997 |
| DE | 29713483 | 1/1998 |
| DE | 102005055199 | 5/2007 |
| DE | 102008048515 A1 | 3/2010 |
| DE | 112012001492 T5 | 1/2014 |
| GB | 900320 A | 7/1962 |
| WO | WO206110133 A1 | 10/2006 |
| WO | WO2012095203 A1 | 7/2012 |

* cited by examiner

BALL BEARING, IN PARTICULAR PISTON ROD BALL BEARING AND PISTON ROD WITH BALL BEARING

RELATED APPLICATIONS

This application claims priority from and incorporates by reference German patent application number DE 10 2015 103 463.8 filed on Mar. 10, 2015.

FIELD OF THE INVENTION

The invention relates to a ball bearing and to a piston rod with ball bearing.

BACKGROUND OF THE INVENTION

In internal combustion engines a high compression ratio influences efficiency of the internal combustion engine in a positive manner. Compression ratio is typically defined as a ratio of an entire cylinder volume before compression to the remaining cylinder volume after the compression. Internal combustion engines with external ignition, in particular gasoline engines which have a fixed compression ratio only allow to select the compression ratio up to a certain number so that so called knocking under full load of the internal combustion engine is avoided.

However, for the partial load range of the internal combustion engine, thus at a lower degree of filling of the cylinders the compression ratio can be selected with higher values without incurring "knocking". The important partial load range of an internal combustion engine can be improved when the compression ratio is variably adjustable. Systems with variable piston rod length are known for example for adjusting the compression ratio.

A piston rod is known for example from DE 10 2005 055 199 A1 in which a pivotable lever is inserted into the small piston eye wherein an eccentrical element is inserted into a central opening of the pivotable lever. The eccentrical element is configured to receive a piston pin. The lever forms a shaft—hub connection with the eccentrical element. Since the connection is highly loaded during operation of the piston rod requirements with respect to manufacturing tolerances of the connected elements are high. The support rods supported at an upper piston rod bearing eye are supported with a ball bearing in ball head receivers and bolted down at this location with transversal bolts.

BRIEF SUMMARY OF THE INVENTION

It is an object of the invention to provide a high load rated ball bearing with a ball head supported in a ball head receiver wherein the ball bearing can be mounted in a simple manner, bears high loads and allows manufacturing tolerances.

It is another object of the invention to provide a piston rod with the ball bearing.

The object is achieved by a ball bearing including a ball head arranged at a support rod and supported in a ball head receiver, wherein the ball head is secured at an outer surface of the ball head in the ball head receiver by a retaining ring against sliding out of the ball head receiver.

The object is also achieved by a piston rod including at least one ball bearing recited supra and by an internal combustion engine including a variable compression ratio and at least one piston rod recited supra.

Advantageous embodiments and advantages of the invention can be derived from the dependent claims, the description and the drawing figures.

A ball bearing is proposed that includes a ball head that is arranged at a support rod and supported in a ball head receiver, wherein the ball head is secured at its outer surface in the ball head receiver by a retaining ring against sliding out of the ball head receiver.

The retaining ring can be inserted into the ball head receiver in a simple manner. The retaining ring can be configured symmetrical in particular along its longitudinal axis so that assembly can be performed without any risk of mix up. Alternatively the configuration can also be unsymmetrical. Advantageously the ball head is pivotable in the ball head receiver and simultaneously axially pullable from the ball head receiver only with a high pull out force.

According to an advantageous embodiment of the invention the retaining ring can be applied with a preload against a wall of the ball head receiver. The radial preload already secures the ball head in the axial direction.

According to an advantageous embodiment of the invention the ball head receiver can have an undercut at its open end wherein the undercut axially secures the retaining ring in the ball head receiver. An undercut of this type can be manufactured in a simple manner and provides a particularly high level of safety against the retaining ring and thus the ball head sliding out of the ball head receiver.

According to an advantageous embodiment of the invention the ball head receiver can include a cambered base element adjacent to which a cylindrical space adjoins in the axial direction. The cambered base element is advantageously adapted to the outer contour of the ball head in a contact portion so that the ball head is easily pivotable. Simultaneously the cambered base element provides a defined end position of the ball head in the axial direction. The cambered portion is advantageously approximately as deep as the radius of the ball head. The cylindrical space provides room for receiving the retaining ring and has a greater diameter than the ball head.

According to an advantageous embodiment of the invention the retaining ring can be interrupted at its circumference. The retaining ring can reduced in circumference using a suitable assembly tool and can be inserted into the ball head receiver and can expand its circumference thereafter and can contact the wall of the ball head receiver with a radial preload. Thus, the inner diameter of the ball head receiver in the provided contact portion with the retaining ring and the outer diameter of the retaining ring can be adapted to each other in a suitable manner.

According to an advantageous embodiment of the invention the retaining ring can have a radially inward oriented shoulder at a face oriented towards the ball head in installed condition. This can be a beaded over edge or also one or plural inward beaded wall elements of the retaining ring. The retaining ring can be for example a stamped sheet metal component.

According to an advantageous embodiment of the invention the retaining ring can have a radially inward oriented camber. Particularly advantageously this camber can be symmetrical to a center of a longitudinal axis of the retaining ring. This facilitates a contact between the retaining ring and the ball head that provides particularly low abrasion so that increased purity requirements can also be complied with.

According to an advantageous embodiment of the invention the retaining ring can be made from plastic material.

The ball head can be advantageously made from metal. The pairing metal/plastic is particularly advantageous to prevent abrasion.

According to another aspect of the invention a piston rod is proposed that includes at least one ball bearing with a ball head arranged at a support rod, wherein the support rod is supported in a ball head receiver and wherein the ball head is secured at its outer surface in the ball head receiver by a retaining ring against sliding out of the ball head receiver. The ball bearing can be manufactured in a simple and cost effective manner, can be mounted in a simple manner and provides a high pull out force against the ball head being pulled out of the ball head receiver.

BRIEF DESCRIPTION OF THE DRAWINGS

Additional advantages can be derived from the subsequent drawing description. The drawings illustrate embodiments of the invention, The drawings, the description and the claims include several features in combination. A person skilled in the art will advantageously view the features individually and will combine them to form useful additional combinations, wherein:

DETAILED DESCRIPTION OF THE INVENTION

Figure 1:
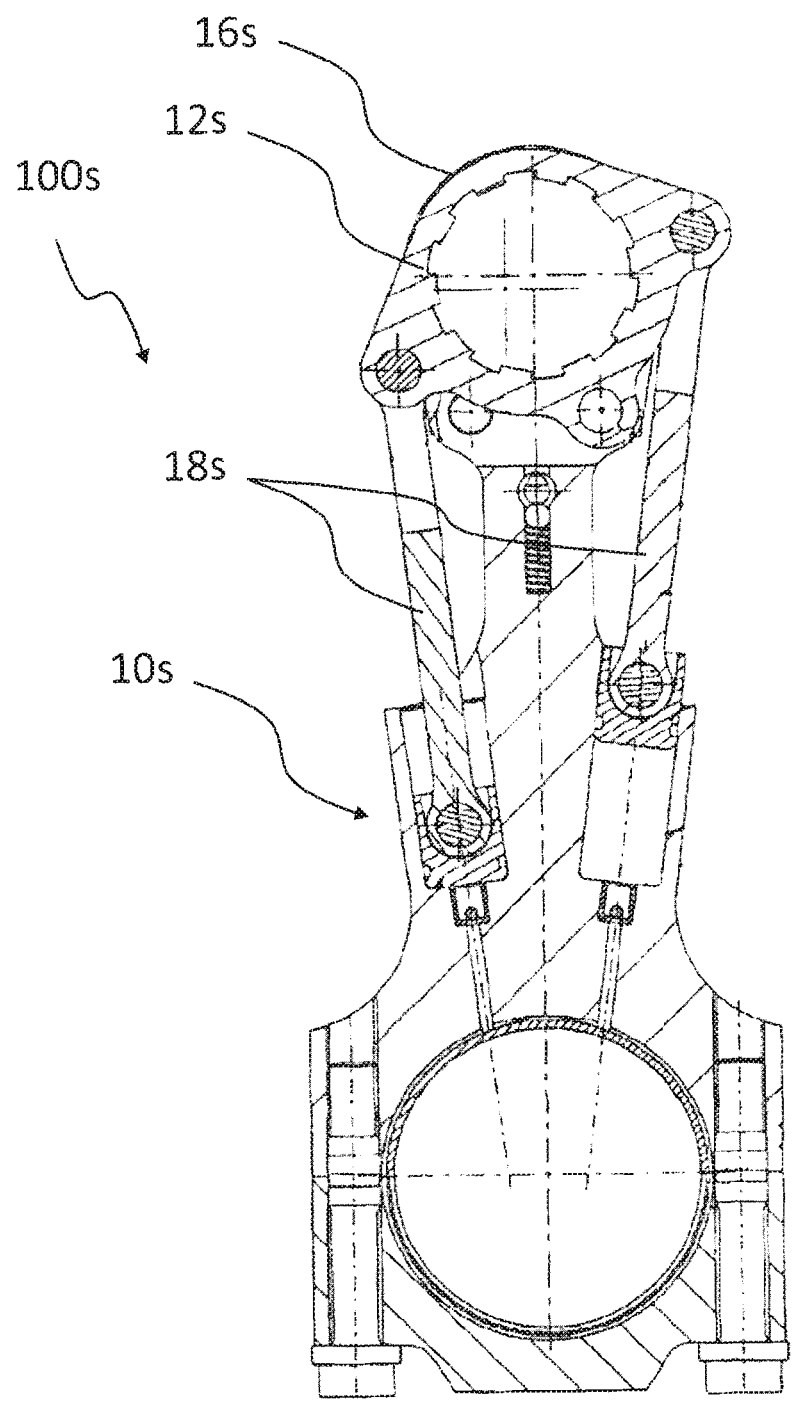
FIG. 1 illustrates a longitudinal sectional view of a piston rod with two ball bearings that is known in the art.

Identical or equivalent components are designated with identical reference numerals in the drawing figures. The figures illustrate exemplary embodiments and do not limit the spirit and scope of the invention.

The known piston rod 100s illustrated in FIG. 1 includes an upper piston rod bearing eye 12s which is provided for receiving a non illustrated piston pin. This piston pin is typically inserted with a press fit into a combustion cavity piston of an internal combustion engine. The upper piston rod eye 12s is separated from the lower large piston rod bearing eye by a connecting rod.

The upper piston rod bearing eye 12s is pivotable about a pivot axis by a bearing element that is configured as an eccentrical element wherein the pivot axis is arranged parallel offset to a longitudinal axis of the upper piston rod bearing eye 12s. For this purpose the eccentrical element is inserted into an opening of a lever 16s. Thus, it is possible to adjust the upper piston rod bearing eye 12s with respect to its distance from a piston rod bearing axis of the lower piston rod bearing eye in the figure and to implement a variable compression ratio in the combustion chamber of the internal combustion engine through the actuation pistons 18s supported at the upper piston rod bearing eye 12s. For this purpose the actuation pistons 18s are supported with a ball bearing 10s in receivers and bolted down at this location with transversal bolts. The actuation pistons 18s are loaded with a hydraulic pressure that acts in the hydraulic cavities that interact with the actuation pistons 18s.

Figure 2:
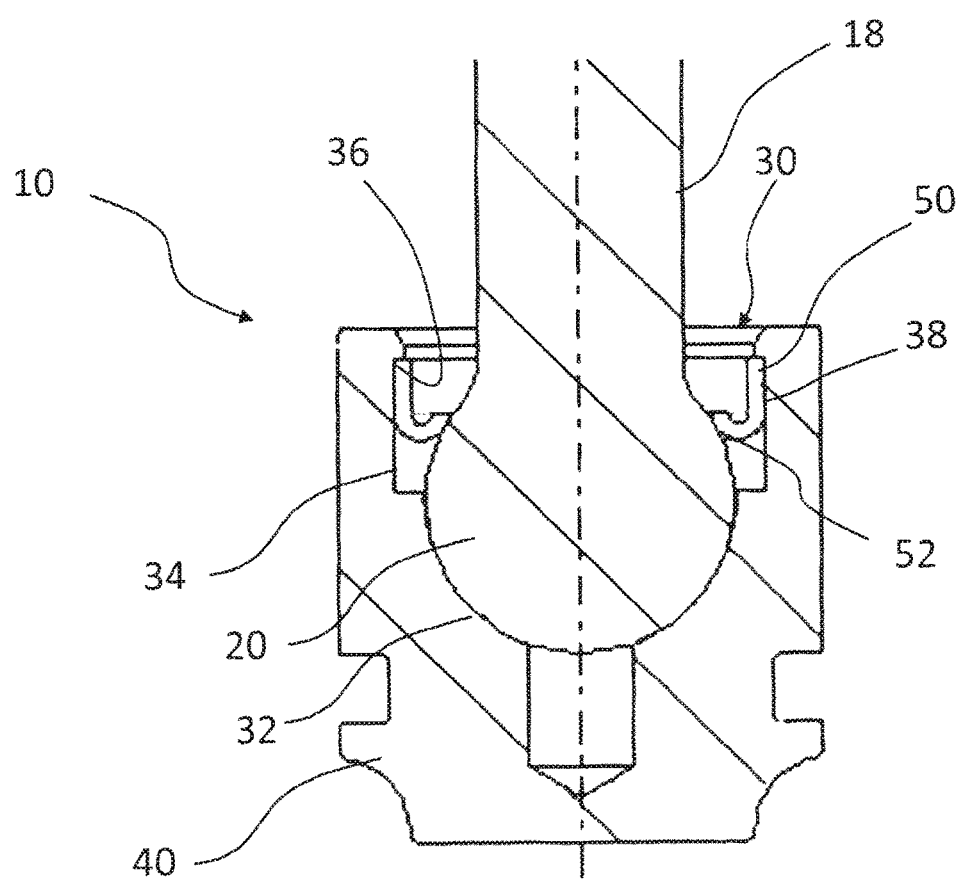
FIG. 2 illustrates a first embodiment of a ball bearing according to an embodiment of the invention.

FIG. 2 illustrates a first embodiment of a ball bearing 10 according to an embodiment of the invention. The ball bearing 10 includes a ball head 20 arranged at a support rod 18 which ball head is supported in a ball head receiver 30 of an outer component 40. The ball head 20 is secured at its outer surface in the ball head receiver 30 by a retaining ring 50 against sliding out of the ball head receiver 30.

The ball head receiver 30 includes a cambered base element 32 which is adapted to the outer contour of the ball head 20 and on which the ball head 20 can slide in order to facilitate a tilting of the support rod 18. In an axial direction towards an open end of the ball head receiver 30 a cylindrical space 34 adjoins in which the retaining ring 50 is arranged.

The ball head receiver 30 includes an undercut 36 at its open end, wherein the undercut secures the retaining ring 50 in the ball head receiver 30 in the axial direction. This provides a high level of safety against the retaining ring 50 sliding out or being pulled out and thus the ball head 20 being pulled out the ball head receiver 30.

The retaining ring 50 is applied with a preload against a wall 38 of the ball head receiver 30. Thus, the retaining ring 50 is slotted and can be compressed for assembly and insertion into the ball head receiver 30. Furthermore the slotted retaining ring 50 can be pushed over the support rod 18 in a simple manner.

The retaining ring 50 is configured e.g. as a sheet metal component and includes a radially inward oriented shoulder 52 at its face oriented towards the ball head 20 in the installed condition, wherein the shoulder 52 limits an axial movement of the ball head 20. Simultaneously the ball head can slide on the shoulder 52 with its outer surface when being tilted.

Figure 3:
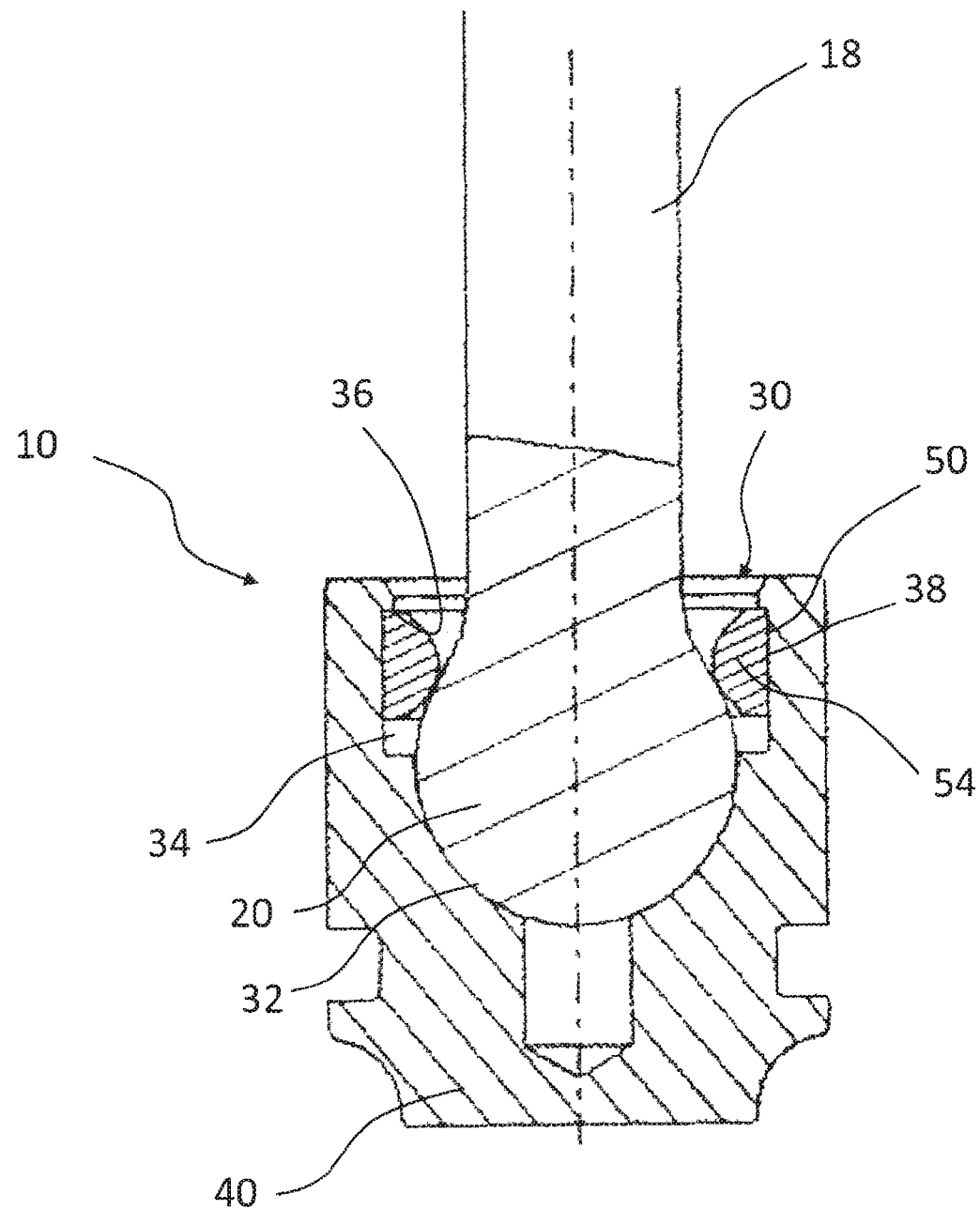
FIG. 3 illustrates another embodiment of a ball bearing according to an embodiment of the invention.

FIG. 3 illustrates another embodiment of a ball bearing 10 according to an embodiment of the invention. The ball bearing 10 includes a ball head 20 that is arranged at a support rod 18, wherein the ball head 20 is supported in a ball head receiver 30 of an external component 40. The ball head 20 is secured at its outer surface in the ball head receiver 30 through a retaining ring 50 against sliding out of the ball head receiver 30.

The ball head receiver 30 includes a cambered base element 32 which is adapted to the outer contour of the ball head 20 and on which the ball head 20 can slide in order to facilitate tilting of the support rod 18. A cylindrical space 34 adjoins in an axial direction towards an open end of the ball head receiver 30 wherein the retaining ring 50 is arranged in the cylindrical space 34.

The ball head receiver 30 includes an undercut 36 at its open end wherein the undercut axially secures the retaining ring 50 in the ball head receiver 30. This provides a high level of safety for the retaining ring 50 against sliding out or being pulled out and thus the ball head 20 being pulled out of the ball head receiver 30.

The retaining ring 50 is thus applied with a preload against a wall 38 of the ball head receiver 30. Thus, the retaining ring 50 is slotted and can be compressed for assembly purposes and can be inserted into the ball head receiver 30. Furthermore the slotted retaining ring 50 can be pushed over the support rod 18 in a simple manner.

The retaining ring 50 is made e.g. from plastic material and includes a radially inward oriented camber 54 at its face that is oriented towards the ball head 20 in the installed condition, wherein the camber limits an axial movement of the ball head 20. Simultaneously the ball head can slide on the camber 54 with the outer surface of the ball head when being tilted.

The ball bearing 10 is advantageously used for supporting the support rod 18 of a piston rod 100 which is for example used in an internal combustion engine with an adjustable compression ratio wherein the piston rod 100 as described supra can include devices for adjusting an effective piston rod length. Also under high load the ball head 20 of the ball bearing 10 is securely supported in the ball head receiver 30.

What is claimed is:

1. A connecting rod for a variable compression ratio internal combustion engine, comprising: an upper piston rod bearing located on an upper end of the connecting rod, wherein the upper piston rod bearing is connected to a plurality of actuation pistons to adjust an effective length of the connecting rod by actuating the upper piston rod bearing into different angular positions due to reciprocation of the plurality of actuation pistons, wherein the actuation pistons each include a ball bearing that provides a ball head arranged at a lower end of the actuation pistons and supported in a ball head receiver, wherein the ball head is secured at an outer surface of the ball head in the ball head receiver by a retaining ring against sliding out of the ball head receiver, wherein the ball head receiver includes an undercut integrally provided with the ball head receiver in one piece at an open end of the ball head receiver, wherein the undercut secures the retaining ring in the ball head receiver in an axial direction of the ball head receiver, wherein the ball head receiver includes a cambered base portion which is adjoined by a cylindrical cavity in the axial direction of the ball head receiver, wherein the retaining ring is applied against a wall of the cylindrical cavity with a preload, wherein the retaining ring has shoulder that is oriented radially inward with respect to the ball head at a face of the retaining ring oriented towards the ball head in an installed condition of the retaining ring, and wherein the retaining ring includes a convex camber oriented in a radially inward direction of the retaining ring.

2. The connecting rod according to claim 1, wherein the retaining ring is interrupted at its circumference.

3. The connecting rod according to claim 1, wherein the retaining ring is made from plastic material.

* * * * *